United States Patent [19]

Starcke et al.

[11] Patent Number: 5,871,810
[45] Date of Patent: Feb. 16, 1999

[54] PLATING ON NONMETALLIC DISKS

[75] Inventors: Steven Francis Starcke, Rochester, Minn.; John David Amundson, Appleton, Wis.; Douglas Howard Piltingsrud; James Aloysius Hagan, both of Rochester, Minn.

[73] Assignee: International Business Machines Corporation, Armonk, N.Y.

[21] Appl. No.: 461,400

[22] Filed: Jun. 5, 1995

[51] Int. Cl.$^6$ ..................................................... V05D 6/02
[52] U.S. Cl. ..................... 427/226; 427/364; 427/365; 427/367; 427/464; 427/314; 427/419
[58] Field of Search .................................. 427/304, 305, 427/307, 309, 226, 419.2, 404, 314

[56] References Cited

U.S. PATENT DOCUMENTS

| | | | |
|---|---|---|---|
| 2,763,569 | 9/1956 | Bradstreet et al. | |
| 3,716,394 | 2/1973 | Waggoner et al. | 427/304 |
| 3,850,665 | 11/1974 | Plumat et al. | |
| 4,131,692 | 12/1978 | Seebacher | 427/101 |
| 4,397,671 | 8/1983 | Vong | 65/60.52 |
| 5,043,182 | 8/1991 | Schultze et al. | 427/34 |
| 5,118,529 | 6/1992 | Klinedinst | 427/213 |
| 5,462,897 | 10/1995 | Boom et al. | 427/304 |

FOREIGN PATENT DOCUMENTS

| | | |
|---|---|---|
| 81145548 | 9/1981 | Japan . |
| 3183678 | 9/1991 | Japan . |
| 4280817 | 6/1992 | Japan . |

OTHER PUBLICATIONS

Bradley et al, *Metal Alkoxides*, N.Y., Academic Press, 1978 (no mo.) pp. 70, 71, 62, 63, 54 and 338.

Severin et al., The influence of substrate chemistry on the adhesion of electrolessly deposited Ni(P) on metal oxide coated ceramics, *Thin Solid Films*, 250, No. 1/2, Oct. 1, 1994, pp. 115–125.

*Primary Examiner*—Janyce Bell
*Attorney, Agent, or Firm*—John J. Gresens; Matthew J. Bussan

[57] ABSTRACT

The invention is a method of plating a nonmetallic substrate comprising the steps of depositing an adhesion enhancing film on the substrate, treating the adhesion enhancing film to make the film catalytic, and forming an outer coating and passivating plate on the adhesion enhancing film. The resulting plated, nonmetallic substrates may comprise any number of materials used as an inner substrate such as compounds of oxide, nitride, phosphide, carbide, glass, ceramic, and mixtures thereof. In use, the resulting substrate may find application in any number of data storage and retrieval application.

10 Claims, 2 Drawing Sheets

PLATING ON NONMETALLIC DISKS

FIELD OF THE INVENTION

Generally, the invention relates to methods of metal plating. More specifically, the invention relates to methods for applying a metal film to nonmetallic substrates including the component parts of hard disk drives.

BACKGROUND OF THE INVENTION

In the computer industry, hard disk data storage elements or memory are generally made from aluminum or an aluminum alloy. Through any variety of processes, the aluminum is treated or otherwise coated and passivated so that it may act as a repository for information which is electronically written onto the disk. Coating and passivating a hard disk data storage element is generally undertaken to provide a surface which is both chemically and mechanically appropriate for use in a data storage environment. Mechanical coating and passivation of the disk covers defects and provides a surface which is capable of being polished and super finished. Chemical passivation of the disk includes the covering or sealing of any defect promoting constituents on the disk surface. One means of coating and passivating the aluminum is to apply a nickel phosphorous plating onto the aluminum disk drive.

Hard disk memory components have certain properties or characteristics which make them commercially practicable products. For example, hard disk components should be smooth or have an ability to be super finished to near atomic smoothness. The disk should also be free of defects such as holes, pits, digs, scratches and mounds. The disk should also be thin so that as many disks as possible can be packaged or placed in a disk drive. Fabricating a disk which is thin and has a low mass is also easier on the drive motor. The disk should also be hard and quite stiff. High stiffness, as measured by the modulous of elasticity, allows the disk to avoid harmonic vibration. One other attribute that the disks preferably have is a lower cost.

The conventional material used in this fabrication has traditionally been aluminum or an aluminum magnesium alloy. Coating this alloy with a nickel plate provides a hard exterior surface which allows the disk to be polished and super finished.

While the nickel plate on the exterior of the disk provides a certain level of hardness, the aluminum alloy used as the internal substrate of the disk is not ideal as it provides a relatively soft less rigid internal substrate. As a result, any shock to the file that is intense enough to lift the read/write transducer off the disk may create a defect in the nickel plate which will continue through to the aluminum substrate. In essence, the aluminum substrate of the disk provides no additional hardness or stiffness to assist in reducing the occurrence of defects.

One alternative to aluminum substrates for hard disks is the use of nonmetallic materials such as glass, glass ceramic, and ceramic. Various coating methods have been developed for coating these materials.

For example, Japanese patent 4280817 discloses a method for forming a thin zirconia film on a glass substrate. Zirconium n-propoxide, acetic acid and water are reacted to form a zirconia precipitate precursor gel, mixed with acetic acid and n-butanol, heated to 60° C. coated and sintered onto the glass. The coated glass is thermally treated at 500° C. to form cubic zirconia. Vong, U.S. Pat. No. 4,397,671, discloses a method for forming a metal oxide film on the surface of a heated glass substrate by forming a powder from an organic based metal salt which is heat decomposable, such as metal acetyl acetonates. There is no disclosure of forming a zirconia coating on the heated glass.

Additionally, Seebacher, U.S. Pat. No. 4,131,692, discloses a method for making a ceramic resistor by applying a solution of palladium chloride to the surface of a ceramic body and stoving in the coating, after which a second layer is formed by plating in a nickel bath.

Plumat et al, U.S. Pat. No. 3,850,665, disclose forming a metal oxide coating on a vitreous or nonvitreous substrate by applying to the substrate a composition comprising an acetyl acetonate coprecipitate of two or more metals. The substrate and composition are simultaneously or subsequently heated to convert the coprecipitate to a metal oxide coating. Among the metals which can be precipitated are mixtures of two or more of iron, nickel, cobalt, zinc, vanadium, copper, zirconium, chromium, manganese, yttrium, tungsten, and indium. Klinedinst, U.S. Pat. No. 5,118,529 discloses a method for coating titanium dioxide onto surfaces such as those comprising zinc sulfide, phosphor to provide for any number of enhanced properties including chemical resistance in absorbency, as well as the filtering or reflection of electromagnetic radiation.

Further, Schultze et al, U.S. Pat. No. 5,043,182 discloses a method for producing ceramic metal composite materials through the application of ceramics onto a substrate. Subsequently, molten metal is infiltrated into the pores of the ceramic material. Bradstreet et al, U.S. Pat. No. 2,763,569 discloses a coating method for use in the application of refractory metal oxide films onto metal parts which are subjected to high temperature during operations such as jet engines.

Even still, problems exist with the coating of nonmetallic substrates. Nonmetallic substrates such as, for example, glass, glass/ceramic and ceramic, all have the requisite hardness and stiffness for hard drive applications. However, each of these materials has its own particular problems.

Glass provides a hardness which is superior to aluminum with a small increase in stiffness. However, most glasses have alkaline metal ions present in their composition which may cause a corrosive effect known as a salt bloom. This chemical phenomena may additionally contribute to disk malfunction. Even after sputtering a magnetic layer, and wear layer, the glass is not completely sealed and corrosion problems may occur.

Glass/ceramics provide superior hardness and stiffness. However, glass ceramics cannot generally be super finished. Specifically, glass ceramics are difficult to polish while preventing other physical phenomenons during the polishing cycle. Because of hardness of glass/ceramics, finishing cycles are very long and the disks begin to adopt certain characteristics which are undesirable such as edge roll off.

Ceramic materials also provide superior stiffness and hardness when compared to aluminum substrates. However, due to the crystalline nature of ceramics, the material inherently has defects such as pits and holes. Further, due to the absolute hardness of ceramics, the material is difficult to super finish. One alternative to creating a hard disk from a ceramic composition is to fabricate the ceramic through a hot isostatic press processing. However, even with this extreme, the ceramic still retains porosity inherent in all ceramics but with substantially less defects.

However, nonmetallic composition such as glass, glass/ceramic and ceramic by themselves lack the properties necessary for use in memory storage applications such as computer disk drives. In order to improve the memory storage properties of all these nonmetallic materials, the surface coating/passivation must be undertaken. Surface coating/passivation can be achieved by plating a layer of nickel phosphorus onto the nonmetallic substrate. However, nickel phosphorous plating nonmetallic substrates generally fails due to poor adhesion. Plated materials can adhere to a substrate either chemically or mechanically. Plated materials do not tend to bond well to nonmetallic substrates. Thus, mechanical adhesion is a natural alternative. Unfortunately, nonmetallics such as glass, glass/ceramic and ceramic tend to be smooth and no mechanical bonding can be obtained.

As a result, there is a need for processes and resulting articles which resist defects, provide a smooth substrate surface, (to atomic smoothness), are relatively thin, have low mass and have high stiffness and hardness.

SUMMARY OF THE INVENTION

In accordance with a first aspect of the invention, there is provided a method of plating a nonmetallic substrate. The method includes depositing an adhesion enhancing film on the substrate and treating adhesion enhancing film to make the film catalytic. After treatment, an outer coating and passivating plate is formed on the catalytic adhesion enhancing film.

In accordance with a second aspect of the invention, there is provided a plated nonmetallic substrate of an inner nonmetallic substrate, an adhesion enhancing film, a catalytic material deposited over or with the adhesion enhancing film, and an outer passivating plate deposited over the adhesion enhancing film.

In accordance with a further aspect of the invention there is provided a data storage and retrieval device using the plated nonmetallic disk for data storage and retrieval of the invention.

We have found that the pretreating of the nonmetallic substrate assists greatly in plating operations. In order for nickel to adhere to glass, a boundary layer which will adhere to both nickel and glass must be used. Ceramics such as titanium, zirconium, aluminum, and niobium oxides bond very well to glass. Also, ceramics can be formed to be porous and microscopically rough. Micro-roughness and porosity create good mechanical adhesion between the ceramic and the plated material. In addition to cost advantages, glass, glass/ceramic, and ceramic have better head slap resistance, and an improved stiffness to weight ratio over aluminum.

This concept is more clearly demonstrated by spraying a solution of zirconium n-propoxide on to a hot glass disk. When the solution contacts, the disk, the compound decomposes to zirconium oxide. Palladium acetate may also be mixed in the solution. The palladium acetate decomposes to palladium metal upon heating. Palladium is catalytic in electroless nickel plating solution and thus after this treatment, the disk is ready to plate.

Especially when considering use of certain nonmetallic substrates such as glass, glass/ceramic, and ceramic, the nickel phosphorus plating alleviates many of the problems inherent with these materials to provide hard and/or stiff disks which are superior to those presently known and used in the art. The nickel phosphorus plating of a glass substrates eliminates problems of corrosion as it encapsulates all the alkaline metal ions which may leach out. In the use of a glass/ceramic substrate, nickel phosphorus provides a surface which is much more easily finished in substantially shorter cycle times thereby preserving the physical integrity of the resulting disk. Nickel phosphorus coating also solves porosity problems with crystalline ceramic material which lead to defects.

BREIF DESCRIPTION OF THE DRAWINGS

FIG. 1 is a top perspective view of a data storage system with its upper housing cover removed; and FIG. 2 is a side plan view of a data storage system comprising a plurality of data storage disks.

DETAILED DESCRIPTION OF THE PREFERRED EMBODIMENT

Figure 1:
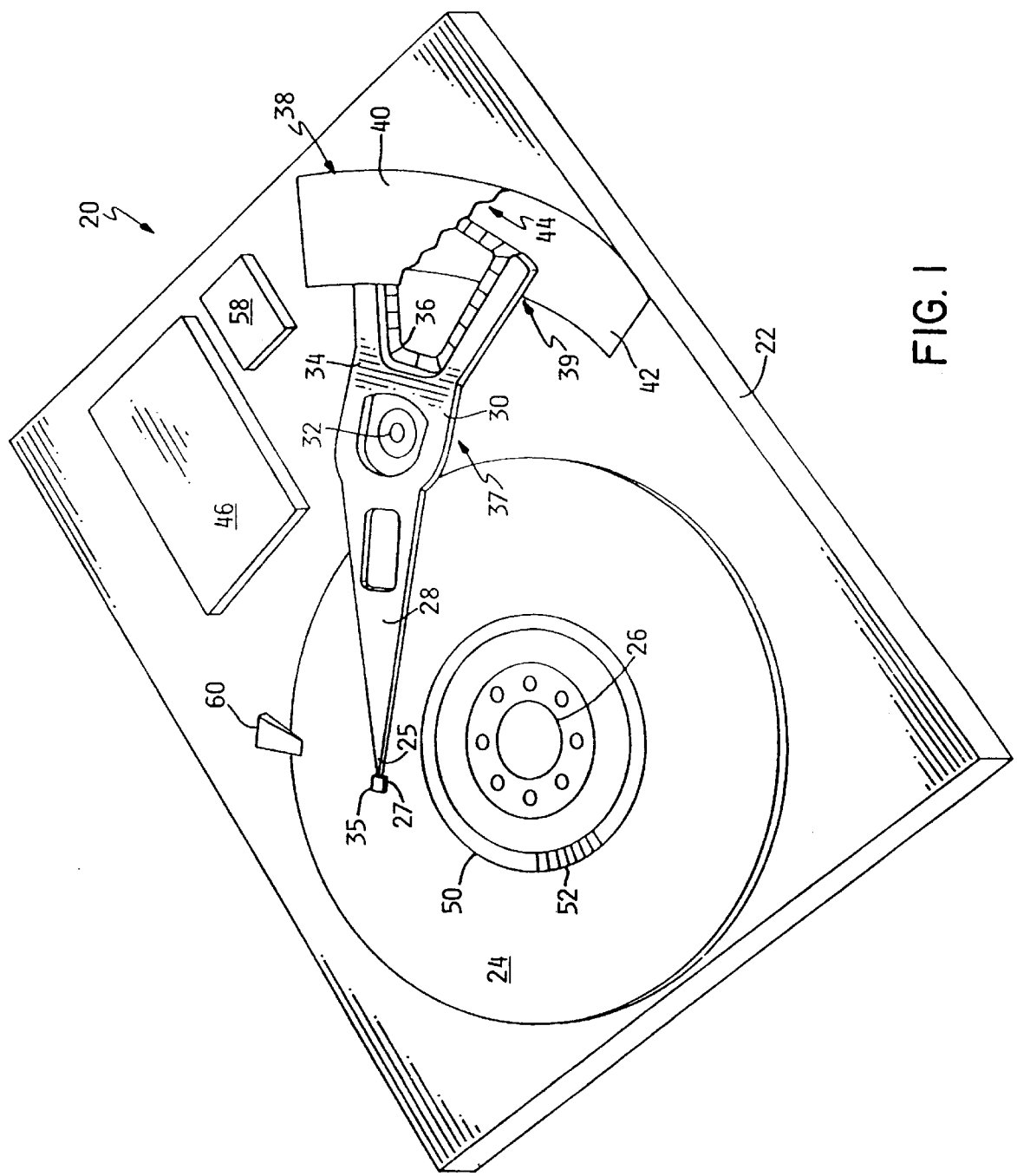

The invention is a method of plating a nonmetallic substrate which includes, depositing an adhesion enhancing film on an inner substrate, treating the adhesion enhancing film to make the film catalytic, and forming an outer coating/passivating plate on the adhesion enhancing film. The invention is also a plated nonmetallic substrate resulting from the method and data storage and retrieval devices using the plated substrates.

A. The Process

The process of the invention allows the production of hard and/or stiff disks for disk storage devices and computer systems from nonmetallic substrates.

As a first step in the process of the invention, a nonmetallic substrate or blank may be obtained through any number of means known to those of skill in the art. Examples of substrates or blanks which may be used in accordance with the process of the invention include floated or molded glasses, glass/ceramics, or ceramics which are made from processes known to those of skill in the art or are acquired from commercial sources. Generally, these substrates or blanks are disks with a centrally configured hole and configured edges.

In order to render the surface of the substrate receptive to adhesion, the substrate may be treated. Any number of processes may be used to provide enhanced mechanical adhesion and/or chemical adhesion. Generally, mechanical adhesion may be provided by etching the surface of the substrate or blank to create a surface capable of mechanical interlocking.

Any etchant which will create this type of a effect in the substrate surface may be used in accordance with the invention. Etchants useful to this end include any acidic or molten caustic composition. Exemplary compositions include hydrogen fluoride, sodium hydroxide, and potassium hydroxide. Use of a chemical etchant on the nonmetallic substrate provides defects on the surface of the substrate which, in relationship to the plane of the substrate, are both vertical and horizontal. In doing so, the etchant has a keying effect which allows subsequent layers to be attached to the substrate through a mechanical means.

Preferably, the etchant used on the substrate surface will depend upon the composition of the nonmetallic substrate or blank. In the case of glass, glass/ceramic, and ceramic, preferred etchants include eutectic mixture of lithium hydroxide, sodium hydroxide or potassium hydroxide. The sodium hydroxide generally has a concentration within the mixture of 60 wt-% and a potassium hydroxide has a concentration of 40 wt-%. Generally, etching is completed by immersing the surface to be etched on the substrate in the caustic mixture for a period of time ranging from about 10 seconds to 20 minutes. During this time the environmental temperature is maintained in a range from about 210° C. to 300° C.

Caustic etching may also be completed on the surface of the nonmetallic blank or substrate by applying the caustic through a water solution which is then baked off through the application of heat ranging from about 210 ° C. to 300 ° C.

After etching, an inner layer of film may then be applied to enhance the chemical and mechanical adhesion of the surface of the substrate. Generally, any number of films may be used to enhance mechanical and chemical adhesion which will provide a hard, porous and spongy surface with good bonding to the nonmetallic substrate. Preferably the inner layer of film will enhance adhesion by defining a system of void spaces. These characteristics will allow the nickel phosphorus to bond firmly to the inner film. Further, the adhesion enhancing inner layer also preferably adheres chemically and/or mechanically to both the substrate and the coating/passivating plating to provide a disk of high structural integrity.

Any number of compounds or compositions may be used as the inner film in accordance with the invention. Preferably, the composition of the inner film results from a thermally decomposable precursor composition. In order to adhere to the nonmetallic substrate or disk, the inner layer preferably comprises a material which has some affinity for the nonmetallic substrate material. When nonmetallics such as glass, ceramic, and mixtures thereof are used as substrates, the inner layer may be formed from metal-organic materials such as alkoxides and partial alkoxides of zirconium, titanium, niobium, vanadium, silicon, aluminum, tin, and mixtures thereof, among others. The alkoxides may be any range of $C_{1-16}$ alkoxide types such as methoxide, ethoxide, propoxide, butoxide, pentoxide, or hexoxide, among others. Preferred compounds include the alkoxides and partial alkoxides of zirconium, titanium, silicon and mixtures thereof, such as zirconium isopropoxide.

In use, these compounds may be applied to the substrate neat or in a solvent base. The solvent functions to homogenize and dilute the compounds as well as suppress flammability during the subsequent heating of the substrate. The solvent may be any number of compositions which can carry the inner layer reactive precursors. Solvents such as alcohols, aliphatics, dichloromethane, and mixtures thereof all perform this function when alkoxides or partial alkoxides are the inner layer precursors. Preferably the alkoxides are present in a concentration of about 0.1 wt-% to 100 wt-% and more preferably about 2 wt-% to 30 wt-%.

In processing, the disk is heated. The inner layer is then applied in precursor form as an atomized solution onto the hot disk. The precursors then decompose to form oxides which are refractory in nature. The resulting film bonds to the nonmetallic substrate and forms a reticulated structure.

Generally, this process may also be completed through any number of other means such as dipping and flashing. The anatomize spray applied to the blank or substrate surface, environmental temperature for heating may range from about 200° to 500° C. depending upon the composition of the nonmetallic substrate. Alternatively, if the substrate is dipped and then exposed to an intense flash of heat energy, the environmental temperature where the flashing operation may range up to about 600° C. over the same time period. The precursor material is applied in an amount effective to form a film having a thickness of about 0.01 $\mu$m to 10$\mu$m.

The surface of the substrate is then treated to make it catalytic or conductive so that it will accept the metallic plating. Catalytic treatment of the substrate surface may be completed subsequent to the formation of the inner layer or, alternatively, simultaneously with the formation on the inner layer. Any surface treatment which will make the surface of the substrate catalytic may be used in accordance with the invention. The surface of the disk may be made catalytic by deposition of any agent which will cause the reaction leading to the deposition of the outer coating and passivating layer to proceed at a faster rate without itself being consumed in the reaction. More specifically, catalytic activity is regarded as the ability to initiate deposition from an electroless plating bath and more specifically from an electroless nickel plating bath.

Known elements useful in making the surface of a disk catalytic include palladium, platinum, gold, silver, nickel, iron, zinc, cobalt, and mixtures thereof. Preferably, palladium is used to make the surface of these substrates catalytic. To this end, the disk may be dipped into a tank containing a palladium source such as acidic palladium chloride. Upon removal, the substrate disk may then be dipped into another solution of stannous chloride after which time it is rinsed. Generally, the composition of the catalytic bath has a concentration of about 0.01 to 0.2 wt-% and preferably about 0.05 to 0.08 wt-% of a catalytic agent such as palladium. The pH of this bath generally ranges from about 1.0 to 4.5. The second bath, containing stannous chloride generally comprises 5% at a Ph of about 3 to 5. The time for immersion in each bath ranges from about 1 to 5 minutes.

If the surface of the substrate disk is to be catalytically treated with the application of the inner layer, the catalytic compound may be co-applied with the alkoxide compound in a dip tank. In such an instance, the dip tank generally comprises 0.05 wt-% to 5 wt-% of a catalytic compound such as palladium acetate, chloroplatinic acid, palladium sulforesinate, or palladium chloride which is soluble in the solvent carrying the precursor used to form the inner layer. The inner layer precursor is generally present in a concentration ranging from about 2 to 30 wt-%.

After application of the catalytic layer, the disk substrate may be plated by means known to those of skill in the art. Any number of coatings may be used to coat and passivate the substrate and, if desired, prepare it as a repository for data storage. Metallic nickel phosphorous is generally the standard in the industry.

Electroless nickel coatings are generally produced by the controlled chemical reduction of nickel ions onto a catalytic surface. The deposit itself is auto catalytic to reduction and the reaction will continue as long as the surface remains in contact with the electroless nickel solution. Because the deposit is applied without an electric current, its thickness is uniform on all areas of an article in contact with fresh solution.

Electroless nickel solutions are blends of different chemicals, each performing an important function. Electroless nickel solutions typically contain a source of nickel, a reducing agent to supply electrons for the reduction of nickel, energy (in the form of heat), complexing agents (chelators) to control the free nickel available to the reaction, buffering agents to resist the pH changes caused by the hydrogen released during deposition, accelerators (exaltants) to help increase the speed of the reaction, inhibitors (stabilizers) to help control reduction, and reactionby-products.

The characteristics of the electroless nickel bath and its deposit are determined by the formulation of these components.

Most hypophosphite reduced electroless nickel solutions now contain nickel sulfate as their source of nickel. Plating baths may be alkaline (operating at pH values greater than 8) and formulated with nickel chloride or nickel acetate. Acid baths often provide improved properties, and are composed of nickel sulfate. This salt is available commercially in a purer state than is nickel chloride, and sulfate baths are thought to produce better quality deposits than either chloride or acetate.

A reducing agent is the material which supplies the electrons needed to reduce ionic nickel to metallic nickel. When a salt, such as nickel sulfate, is dissolved in water, the cation (nickel) separates from the anion (sulfate) to form ionic nickel.

Chemical reduction is the lowering of the electrical charge of an ion. Because metals have no charge the reducing agent in an electroless nickel solution must reduce the metal to a zero valence.

A number of different reducing agents have been used to formulate electroless nickel baths. Among these are sodium hypophosphite, amino-boranes, sodium borohydride, and hydrazine. These baths are described in the following paragraphs.

The majority of electroless nickel used commercially is deposited from solutions reduced with sodium hypophosphite. The principle advantages of these solutions over those reduced with boron compounds or hydrazide are lower cost, greater ease of control, and better corrosion resistance of the deposit.

The theory of action is thought to be that in the presence of a catalytic surface and sufficient energy, hypophosphite ions are oxidized to orthophosphite. A portion of the hydrogen given off is absorbed onto the catalytic surface. Nickel at the surface of the catalyst is then reduced by the absorbed, active hydrogen. Simultaneously, some of the absorbed hydrogen reduces a small amount of the hypophosphite at the catalytic surface to water, hydroxyl ion, and phosphorus. Most of the hypophosphite present is catalytically oxidized to orthophosphite and gaseous hydrogen independently of the deposition of nickel and phosphorus. This is the cause of the low efficiency of electroless nickel solutions. Typically, five times the weight of sodium hypophosphite is required to reduce on weight equivalent of nickel.

Generally, hypophosphite reduced electroless nickel plating solutions are useful in the invention are those which contain nickel sulfate, sodium hypophosphate, lead, and thiroyurea.

B. The Disk or Substrate

Any number of nonmetallic substrates may be used in accordance with the invention which will provide the intended function. In a creation of hard disks or data memory or storage, generally, nonmetallic compositions which are nonpolymeric may be used such as carbides, nitrates, oxides, and phosphides or mixtures thereof. Nonmetallic compositions which may be used in particular include compositions such as silicon carbide, sapphire, titanium nitride, boron carbide, boron nitrate, carbon, silicon nitride, and the like. Additionally, and in accordance with a more preferred aspect of the invention, the nonmetallic substrate may be glass, ceramic, and mixtures thereof.

Glass is generally a silicate material having a structure of silicon and oxygen where the silicon atom is tetrahedrally coordinated to surrounding oxygen atoms. Any number of other materials may be used to form glass such as boron oxide, silicon oxide, germanium oxide, aluminum oxide, boron oxide, phosphorus oxide, vanadium oxide, arsenic oxide, antimony oxide, zirconium oxide, titanium oxide, zinc oxide, lead oxide, aluminum oxide, thorium oxide, beryllium oxide, zirconium oxide, cadmium oxide, scandium oxide, lanthanum oxide, yttrium oxide, tin oxide, gallium oxide, indium oxide, thorium oxide, lead oxide, magnesium oxide, lithium oxide, lead oxide, zinc oxide, barium oxide, calcium oxide, strontium oxide, cadmium oxide, sodium oxide, cadmium oxide, potassium oxide, rubidium oxide, mercury oxide, and cesium oxide.

In the creation of a hard disk comprised of a glass substrate, the glass must generally be processed by cleaning or a hot caustic etch followed by the application of an inner layer film. Subsequently, the glass must be treated to ensure that it is catalytic before nickel plating.

In turn, glass/ceramic nonmetallic materials may be treated similarly. Glass/ceramic disks or substrate may be obtained from Corning Corporation under the tradenames Flint®, Memcor and Memcor II®. These materials tend to be silica-based glasses with oxides such as titanium dioxide, zirconium dioxide, and the like. Any oxide may be used which is not soluble in glass and will crystallize when the glass is fired.

In these instances, a hard data memory or storage disk may be obtained by slicing a blank, edging that blank and then lapping the blank to the desired flatness and thickness. Generally, the thickness of the disk or blank will be about 0.615 mil.

In turn, glass/ceramics generally result from the melt formation of glass and ceramic materials by a conventional glass manufacturing techniques. Subsequently, the materials are heat treated to transform them into fine-grain crystalline materials. Typical glass/ceramics are, for example, β-quartz solid solution, $SiO_2$; β-quartz; lithium metasilicate, $Li_2O$—$SiO_2$; lithium disilicate, $Li_2O$-$2SiO_2$; β-spodumene solid solution; anatase, $TiO_2$; β-spodumene solid solution; rutile $TiO_2$; β-spodumene solid solution; mullite, $3Al_2O_3$-$2SiO_2$; $2SiO_2$; β-spodumene cordierite, $2MgO$-$2Al_2O_3$-$5SiO_2$; spinel, $MgO$-$Al_2O_3$; Mgo-stuffed; β-quartz; quartz, $SiO_2$; α-quartz solid solution, $SiO_2$; spinel, $MgO$-$Al_2O_3$; enstatite, $MgO$-$SiO_2$; fluorphlogopite solid solution, $KMg_3AlSi_{3010}F_2$; mullite, $3Al_2O_3$-$2SiO_2$; and, $(Ba,Sr,Pb)Nb_2O_6$. Given the crystal structure present in the glass/ceramic composition, the caustic etch is optional. Processing may be initiated by the application of the inner layer followed by catalytic treatment of disk or substrate and nickel phosphorus plating.

If the data storage or memory disk is made from a nonmetallic ceramic material, additional processing variables may be considered. Ceramics are generally comprised of aluminum oxides such as alumina, silicon oxides, zirconium oxides such as zirconia or mixtures thereof. Typical ceramic compositions include aluminum silicate; bismuth calcium strontium copper oxide; cordierite; feldspar; ferrite; lead acetate trihydrate; lead lanthanum zirconate titanate; lead magnesium niobate (PMN); lead zinc niobate (PZN); lead zirconate titanate; manganese ferrite; mullite; nickel ferrite; strontium hexaferrite; thallium calcium barium copper oxide; triaxial porcelain; yttrium barium copper oxide; yttrium iron oxide; yttrium garnet; and zinc ferrite. Commodity ceramics are available from Coors as an electronic grate material as well as Kryocera and from Norton as zirconia.

The crystalline nature of ceramic results in inherent pits (triple points) in the surface of the material. It is preferable that the pit size in most ceramic materials for use in accordance with the invention comprise pits no larger than 5 to 20 microns and preferably from about 1 to 5 microns. The disk or substrate may be sliced, edged, lapped, and cleaned. Treatment with a caustic etchant is optional depending upon the level of porosity within the ceramic material. Further, the formation of an inner layer may be also optional depending upon the porosity and characteristics of the material as with alumina.

To create a data storage or a memory disk in accordance with the invention, a catalytic metal should be applied to the disk in accordance with the invention and a nickel phosphorus layer should then be plated onto the nonmetallic disk.

Figure 2:
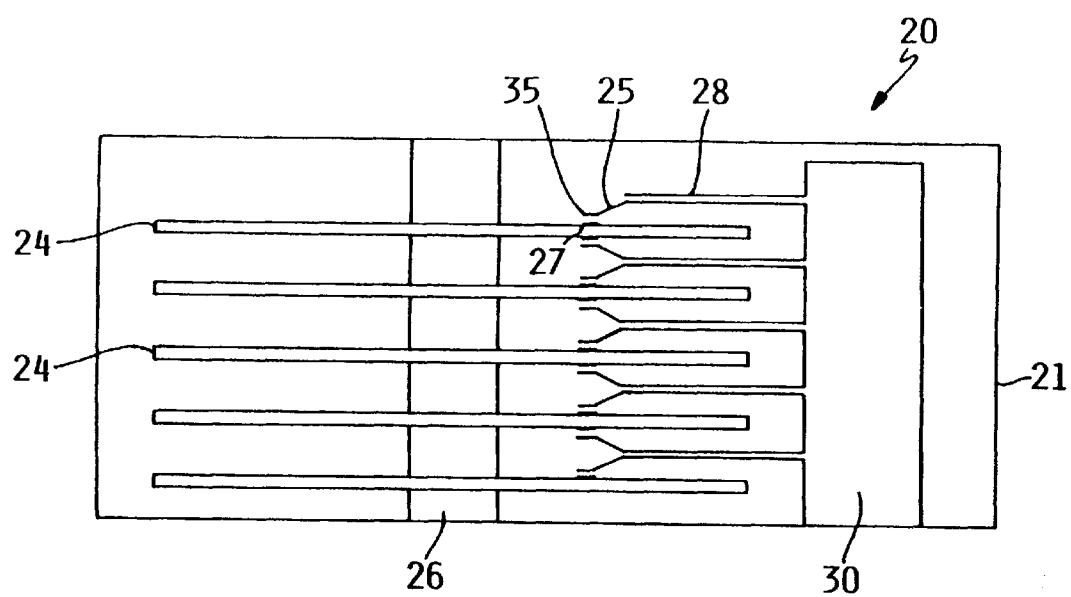

Referring now to the drawings, and more particularly to FIGS. 1 and 2, there is shown a data storage system 20 with the cover 23 removed from the base 22 of the housing 21. The data storage system 20 typically includes one or more rigid data storage disks 24 which are stacked coaxially in a tandem spaced relationship, and rotate about a spindle motor 26 at a relatively high rate of rotation. Each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiralled track configuration.

An actuator 30 typically includes a plurality of interleaved actuator arms 28, with each arm having one or more transducer 27 and slider body 35 assemblies mounted to a load beam 25 for reading and writing information to and from the data storage disks 24. The slider body 35 is typically designed as an aerodynamic lifting body that lifts the transducer 27 off of the surface of the disk 24 as the rate of spindle motor 26 rotation increases, and causes the transducer 27 to hover above the disk 24 on an air bearing or airflow patterns produced by high-speed disk rotation. A conformal lubricant may alternatively be disposed on the disk surface 24 to reduce static and dynamic friction between the slider body 35 and disk surface 24.

A typical data storage system includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator and passed over the surface of the rapidly rotating disks.

The actuator typically includes a plurality of outwardly extending arms with one or more transducers being mounted resiliently or rigidly on the extreme end of the arms. The actuator arms are interleaved into and out of the stack of rotating disks, typically by means of a coil assembly mounted to the actuator. The coil assembly generally interacts with a permanent magnet structure, and the application of current to the coil in one polarity causes the actuator arms and transducers to shift in one direction, while current of the opposite polarity shifts the actuator arms and transducers in an opposite direction.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a read element and a write element. Other transducer assembly configurations incorporate a single transducer element used to write data to the disks and read data from the disks.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

WORKING EXAMPLES

The following examples further illustrate, but do not limit, the invention.

Glass disks are preheated to 250° C. to prevent thermal shock. The glass disks are then etched in NaOH/KOH molten eutectic solution for 0.5 min at 250° C., cooled, rinsed and loaded into plating fixture and heated to 310° C. The disks are then sprayed with Zirconium Isopropoxide (4%)/PdOAc (0.4%)in dichloromethane. The disks are then cooled to room temperature. Sensitizing the disks is undertaken in $SnCl_2$ 5 % solution. The glass disks are then strike plated in standard electroless bath to 0.3 micron. The glass disks are then plate as normal on disk plating line. The glass disks are then polished as usual including superfinish.

WORKING EXAMPLE 2

Disks using glass/ceramic materials are prepared in accordance with the method of the invention using the processing of Example 1.

WORKING EXAMPLE 3

Ceramic alumina disks are prepared by preheating the disks to 250° C. to prevent thermal shock. The disks are then etched in NaOH/KOH molten eutectic 5 min at 250° C. The disks are then cooled, rinsed and loaded into plating fixture and heated to 350° C. The disks are then sprayed with Zirconium Isopropoxide (10%)/PdOAc (0.1%)/in dichloromethane and cooled to room temperature. The disks are sensitized in $SnCl_2$ 5% solution and subjected to a strike plate in standard electroless bath to 0.3 micron. The disks are then plated as normal on disk plating line and polished as usual including superfinish.

WORKING EXAMPLE 4

Zirconia disks are prepared in accordance with the method of the invention using the process of Working Example 3.

The above discussion, examples and embodiments illustrate our current understanding of the invention. However, since many variations of the invention can be made without departing from the spirit and scope of the invention, the invention resides wholly in the claims hereafter appended.

We claim as the invention:

1. A method of plating a nonmetallic disk substrate, said method comprising the steps of:

(a) simultaneously depositing a precursor composition and a catalytic material onto said nonmetallic substrate, said precursor composition selected from the group consisting of a zirconium alkoxide, a zirconium partial alkoxide, a titanium alkoxide, a titanium partial alkoxide, a niobium alkoxide, a niobium partial alkoxide, a vanadium alkoxide, a vanadium partial alkoxide, a silicon alkoxide, a silicon partial alkoxide, an aluminum alkoxide, an aluminum partial alkoxide, a tin alkoxide, a tin partial alkoxide, and mixtures thereof, and said catalytic material comprises a conductive compound, said nonmetallic substrate selected from the group consisting of a ceramic substrate, a glass substrate, a glass/ceramic substrate, a carbide substrate, a nitride substrate, an oxide substrate, a phosphide substrate, and mixtures thereof, wherein said precursor composition is capable of forming an adhesive enhancing film and upon formation said adhesive enhancing film is made catalytic by said catalytic material;

(b) forming a catalytic adhesion enhancing film by heating and decomposing said precursor composition; and (c) forming an outer plate on said catalytic adhesion enhancing film.

2. The method of claim 1 wherein said precursor composition comprises one or more reactive precursor compounds, said precursor compounds selected from the group consisting of a zirconium compound, a titanium compound, a niobium compound, a vanadium compound, a silicon compound, an aluminum compound, a tin compound and mixtures thereof.

3. The method of claim 1, wherein said precursor composition comprises one or more reactive precursor compounds, said precursor compounds selected from a zirconium alkoxides and partial alkoxides, a titanium alkoxides and partial alkoxides, a silicon alkoxides and partial alkoxides, and mixtures thereof.

4. The method of claim 1, wherein said catalytic adhesion enhancing film has a thickness ranging from about 0.01 μm to 10 μm.

5. The method of claim 1 wherein said adhesion enhancing layer is applied by:

(a) heating said substrate to a temperature ranging from about 200° C. to 600° C.; and (b) depositing a composition of zirconium propoxide onto the substrate.

6. The method of claim 1, wherein said film comprises a conductive compound selected from the group consisting of a palladium compound, a platinum compound, a gold compound, a silver compound, a nickel compound, an iron compound, a zinc compound, a cobalt compound, and mixtures thereof.

7. The method of claim 1, wherein said substrate is treated with an acidic or caustic etchant prior to forming said catalytic adhesion enhancing film on said substrate.

8. The method of claim 1, wherein said nonmetallic disk substrate comprises a nonmetallic disk for use in data storage and retrieval device.

9. The method of claim 8, wherein said nonmetallic disk substrate comprises a material selected from the group consisting of a glass, a ceramic, and mixtures thereof.

10. Method of plating a nonmetallic disk substrate. said method comprising the steps of:

(a) simultaneously depositing a precursor composition and a catalytic material onto said nonmetallic substrate, said nonmetallic substrate selected from the group consisting of a ceramic substrate, a glass substrate, a glass/ceramic substrate, a carbide substrate, a nitride substrate, an oxide substrate, a phosphide substrate, and mixtures thereof, wherein said precursor composition is capable of forming an adhesive enhancing film and upon formation said adhesive enhancing film is made catalytic by said catalytic material;

(b) forming a catalytic adhesion enhancing film by heating and decomposing said precursor composition said catalytic material formed from a reactive conductive precursor comprising palladium acetate, said adhesion enhancing film formed from a reactive adhesion enhancing precursor comprising zirconium propoxide; and (c) forming an outer plate on said catalytic adhesion enhancing film.

* * * * *

UNITED STATES PATENT AND TRADEMARK OFFICE
CERTIFICATE OF CORRECTION

PATENT NO. : 5,871,810

DATED : February 16, 1999

INVENTOR(S) : Steven Francis Starcke, John David Amundson, Douglas Howard Piltingsrud, and James Aloysius Hagan It is certified that error appears in the above-identified patent and that said Letters Patent is hereby corrected as shown below:

Claim 10, Col. 12, Line 19, "Method" should be --A method--.

Claim 10, Col. 12, Line 31, "catalvtic" should be --catalytic--.

Signed and Sealed this

Sixth Day of July, 1999

Q. TODD DICKINSON

Attest:

Attesting Officer

Acting Commissioner of Patents and Trademarks